United States Patent [19]
Pingaud

[11] 3,843,773
[45] Oct. 22, 1974

[54] PROCESS FOR PRODUCING FINE ACICULAR GAMMA FERRIC OXIDE CRYSTALS

[75] Inventor: Bernard-Jean Pingaud, Vincennes, France

[73] Assignee: Eastman Kodak Company, Rochester, N.Y.

[22] Filed: Jan. 31, 1972

[21] Appl. No.: 222,318

Related U.S. Application Data

[63] Continuation of Ser. No. 36,385, May 11, 1970, abandoned.

[52] U.S. Cl. .............................. 423/634, 252/62.56
[51] Int. Cl. .............................................. C01g 49/06
[58] Field of Search ....... 423/634; 75/103; 106/304; 252/62.56

[56] References Cited

UNITED STATES PATENTS

| | | | |
|---|---|---|---|
| 2,558,302 | 6/1951 | Marcot et al. | 423/268 |
| 3,075,919 | 1/1963 | Gruber et al. | 423/634 |
| 3,252,758 | 5/1966 | Hoch et al. | 423/634 |
| 3,288,563 | 11/1966 | Klomp et al. | 423/634 |

FOREIGN PATENTS OR APPLICATIONS

| | | | |
|---|---|---|---|
| 505,751 | 9/1954 | Canada | 423/268 |

*Primary Examiner*—Herbert T. Carter
*Attorney, Agent, or Firm*—Bernard D. Wiese

[57] ABSTRACT

Fine goethite crystals (alpha-FeO.OH, ferric oxide hydrate) are prepared by mixing together a ferrous salt such as the sulfate or chloride and an alkali hydroxide to form a hydroxide precipitate as a dispersion, blowing oxygen through the dispersion at 20°–60°C. to convert ferrous hydroxide particles to goethite crystals, discontinuing blowing, boiling the dispersion to perfect crystallization of goethite crystals, and recovering the goethite crystals by filtering, washing and drying.

The goethite crystals so produced are only about 0.3 microns long, and can be transformed into magnetic ferric oxide crystals which have exceptionally good properties for magnetic recording tapes, particularly for improving the background noise dynamic so that there is less noise during intermittent no-signal periods that may occur during sound recording.

9 Claims, No Drawings

PROCESS FOR PRODUCING FINE ACICULAR GAMMA FERRIC OXIDE CRYSTALS

This is a continuation of application Ser. No. 36,385, filed May 11, 1970 and now abandoned.

BACKGROUND OF THE INVENTION

1. Field of the Invention

The present invention relates to a new process for the preparation of fine magnetic gamma-ferric oxide usable in the preparation of magnetic tapes.

2. The Prior Art

Gamma-ferric oxide, or maghemite, has been known as the material for the production of magnetic tapes useful in the recording and sound reproduction of images or signals. It is known that the acoustical characteristics of these tapes are strongly influenced by the size and the shape of the magnetic gamma-ferric oxide particles. As concerns the shape, the acicular shape has been considered to be the most advantageous, and, preferably, the length of each particle is equal to approximately from three to eight times its diameter. As concerns the size, it is known that when the particles are small, one can obtain tapes which display particular properties, very desirable for certain uses, such as a good no-signal background noise. The no-signal noise is the noise which appears during the reading of a magnetic tape which was submitted only to the premagnetization field without sound recording or other signals. This noise, which is particularly disturbing during the listening of recordings with intermittent silences, is related to the size of the crystals: the smaller the size of the crystals the more the no-signal noise is moved toward frequencies that become higher and higher, i.e., less and less audible. The fine crystals are also advantageous for obtaining a better frequency response thanks to the increase in the level of clear frequencies.

The ferromagnetic compound that is used for the manufacture of magnetic tapes is the acicular iron sesquioxide, gamma-$Fe_2O_3$ or maghemite. This compound is obtained from a non-magnetic hydrated ferric oxide, goethite alpha-FeO.OH. The first step to obtain maghemite is to dehydrate goethite in order to obtain hematite, followed by a reduction to magnetite, then to effect a careful oxidation so as to obtain the magnetic maghemite.

The diagram of the reactions is as follows:

$$2\ \text{alpha-FeO.OH (goethite)} \rightarrow \text{alpha-}Fe_2O_3 + H_2O\ \text{(hematite)}$$

$$3\ \text{alpha-}Fe_2O_3 + H_2 \rightarrow 2\ Fe_3O_4 + H_2O\ \text{(magnetite)}$$

$$2\ Fe_3O_4 + \tfrac{1}{2}\ O_2 \rightarrow 3\ \text{gamma}\ Fe_2O_3\ \text{(maghemite)}$$

For the preparation of the crystals of goethite numerous processes have been used up until now. They consist particularly in precipitating ferrous hydroxide from an alkaline hydroxide solution and a ferrous salt solution, then in oxidizing the precipitated hydroxide. However, the process that is effected in an acid medium (excess of a ferrous solution) or basic (excess of an alkaline solution) yields crystals the size of which (often in the range of 1 micron) are too large for yielding magnetic oxide crystals having good properties, as mentioned previously. When the precipitation of ferrous hydroxide occurs from stoichiometric quantities of reagents, one obtains cubic magnetite mixed with some acicular particles of goethite. One obtains in an acid medium, a mixture of alpha-FeO.OH and lepidocrocite with a small excess of ferrous salt, at low concentrations. If one uses, in an acid medium, a suitable excess and concentration of ferrous salt, it is possible to obtain goethite alone but the sizes of the crystals are too large to impart good properties to the magnetic oxide. In an alkaline medium, one always obtains nothing but goethite; however, with processes used up until now, wherein the ferrous hydroxide is precipitated in an alkaline medium, e.g., in the presence of a strong excess of alkaline hydroxide (approximately 100 percent) the crystals still have a length in the range of 1 micron.

SUMMARY OF THE INVENTION

In accordance with the present invention there is provided a process for the preparation of goethite particles (alpha-FeO.OH) having a length in the order of 0.4 microns, with no trace of other types of iron oxide, such as lepidocrocite and magnetite. These particles are subjected to dehydration, reduction and oxidation to convert them to gamma ferric oxide (maghemite) which is very useful in magnetic recording.

The process according to the invention for the preparation of acicular ferric oxide hydrate, alpha-FeO.OH in the form of fine crystals, consists in precipitating at a temperature below 60°C a ferrous hydroxide from a ferrous salt solution and an alkaline solution used in excess with respect to the stoichiometric quantity that is necessary. The resulting hydroxide dispersion is oxidized at a temperature approximately of from 20°C to 60°C, then is filtered, washed and dried.

The process is characterized in that one disperses, in the absence of any oxidizing agent whatsoever, the solution of ferrous salt in the alkaline solution in such a way that there is practically no localized excess of ferrous salt and that the alpha-FeO.OH concentration in the final dispersion that is obtained is below 15 g/l, that the final concentration of dissolved alkaline hydroxide is below 60 g/l, and, after oxidation, the dispersion is brought to boiling in order to complete the crystallization.

According to the invention, one adds, while stirring vigrouously (in the absence of any oxidizing agent whatsoever) a dilute aqueous solution of a ferrous salt (such as ferrous sulfate heptahydrate) to a solution of an alkali metal hydroxide (such as sodium hydroxide) in an excess of approximately 200 percent with respect to the stoichiometrically necessary quantity, at a temperature below 40°C and at a pH substantially equal to 14 so as to form a ferrous hydroxide precipitate. One then slowly bubbles in through the dispersion a stream comprising gaseous oxygen, such as pure oxygen or air, at a temperature close to room temperature in order to oxidize and transform the ferrous hydroxide particles into goethite crystals. The oxygen is then discontinued and the dispersion is then heated to boiling for several hours in order to complete the crystallization, after which the crystals are filtered, washed and dried. Fine acicular goethite crystals are obtained having an approximate length of 0.3 microns, which can then be transformed into magnetic ferric oxide by means of usual processes, e.g., the process described in British Pat. No. 640,438 and in Phys. Chem. Solids 23 p. 545–554 (1962). During the treatment, the goethite crystals are transformed from the orthorhombic crystalline system to the cubic system, with no outward change in their appearance as crystals.

The precipitation is done, while suitably stirring, by introducing the ferrous salt solution into the alkaline hydroxide solution; or else one may incorporate the excess alkaline hydroxide solution in the reaction container, then introduce at the same time the ferrous salt solution and the alkaline hydroxide solution, these processes making it possible to avoid any localized excess of ferrous salt.

As ferrous salt, one may use ferrous sulfate heptahydrate, as well as other salts such as $FeCl_2$. $4H_2O$. Sodium hydroxide may be used as well as potassium hydroxide.

The ferrous salt concentration may vary, but it must be such at the end of the reaction that the alpha-FeO.OH concentration in suspension is below 15 g/l of solution. The concentration of the alkali hydroxide solution at the beginning of the reaction may also vary, but it must be such that the concentration of the dissolved alkali hydroxide after precipitation is below 60 g/l of solution, e.g. the initial concentration of caustic soda may be 60 g/l.

It is necessary that the precipitation occur in the absence of any oxidation whatsoever, in order to avoid at that state the formation of heterogeneous crystals which would later lead to crystals the magnetic characteristics of which would be different from the desired optimum. The precipitation may be made within a period of time that may vary. It is preferably, done slowly so as to avoid a localized excess of $Fe(OH)_2$. The duration is, advantageously, several hours and may last up to approximately 3 hours.

The temperature of the precipitation may vary. It is preferably below 40°C, since for example, for an excess of 200 percent of sodium hydroxide, above 40°C one obtains a mixture of magnetite and goethite, then at a still higher temperature, magnetite alone. The temperature of the precipitation is advangeously 25°C.

The oxidation is done slowly, at least over a period of 24 hours and, preferably, over several days, e.g., 3 days to 5 days, in order that the crystals are uniform. The temperature is about room temperature. With a higher temperature, one obtains larger crystals. The output of air or oxygen is low, in the range of 5 to 30 l/hr. per liter of solution, in order to have a slow oxidation. In order to obtain homogenous crystals, the growth of the seed crystals must be carefully controlled, which requires a constant rate of oxidation; this can only be accomplished by a progressive introduction of air in the suspension while it is being stirred because the high density of the mixture does not favor in the solution the "solid-gas" contacts. In order to effect the dispersion and the oxidation, one may use any apparatus which will make it possible to disperse a fluid containing a large number of particles in a liquid.

After the oxidation, the suspension is boiled for 6 to 8 hours. This makes it possible to complete the crystallization, i.e., to obtain an arrangement of the crystal lattice that is desirable for obtaining good magnetic properties.

When alpha-FeO.OH ferric oxide crystals are prepared under other conditions, one obtains larger acicular particles, e.g. when the iron concentration in the suspension is above 10 g/l (or the concentration in alpha-FeO.OH above 16 g/l), the concentration of the dissolved alkaline hydroxide above 60 g/l, the air flow 60 l/hr. per liter of solution, the temperature being above 40°C.

THE PREFERRED EMBODIMENTS

The following examples illustrate the invention:

EXAMPLE I

One introduces in a 25 liter container, 12 liters of an aqueous sodium hydroxide solution containing 720 g of NaOH. While stirring the solution, one adds, in 3 hours, under a current of nitrogen and in a homogenous manner, 6 liters of a solution containing 750 g of $FeSO_4$ . $7H_2O$, the temperature being 25°C. Once the precipitation is completed, one bubbles in compressed air through the solution at the rate of 16 l/hr per liter of solution for 5 days, the temperature being 25°C. Goethite crystals are formed. The air is stopped and the reaction mixture is then kept boiling for 6 to 8 hours, so as to complete the crystallization. The product is filtered, washed and dried. The size of the needles is in the order of 0.2 microns to 0.3 microns.

EXAMPLE II

In the preceding example, the ferrous hydroxide precipitation was effected in the presence of an excess of alkaline solution, obviously greater at the beginning than at the end of the reaction. By adding simultaneously, e.g., by means of an intermittent injection pump, the two solutions into the reactor, it is possible to maintain this excess constant during the course of the reaction. This technique facilitates the obtaining of a homogenous substance; it makes it possible, on the other hand, to have available one new method of operation: the time it takes to add the reagents, in order to control the size of the ferric oxide crystals.

In a 2 liter container, one introduces 300 ml of a sodium hydroxide solution containing 25.6 g of NaOH. Over a period of 2 hours, one introduces simultaneously 300 ml of a ferrous sulfate solution containing 37.5 g of $FeSO_4$ . $7H_2O$, and 300 ml of a sodium hydroxide solution containing 10.4 g of NaOH. The mixture is stirred and the precipitated ferrous hydroxide is oxidized with an air flow of 30 l/hr per liter of solution, for 3 days. The temperature during precipitation and oxidation is kept at 25°C. One obtains fine and uniform goethite crystals.

EXAMPLE III

The same procedure as above is effected, this time by introducing the reagents within 3 hours. One observes, in this case, a substantial increase in the length of the goethite needles.

The precipitation and the oxidation of the ferrous hydroxide may also be effected with a solution of potassium hydroxide and ferrous sulfate, having the same concentrations. One may also introduce the ferrous sulfate in the solid state into the alkaline solution in order to avoid the instability of this compound in solution.

EXAMPLE IV

After treatment of the alpha-FeO.OH ferric oxide crystals (according to the process described in British Pat. No. 640,438) in order to obtain magnetic gamma-$Fe_2O_3$ ferric oxide crystals, one may prepare a magnetic tape in the usual manner. The obtained results with a magnetic tape comprising oxide crystals prepared according to the invention are compared with those obtained with a magnetic tape containing conventional oxide crystals having from 0.7 microns to 0.8 microns in length. One observes, with the oxide crystals prepared according to the invention, an improvement of 2 to 3 decibels in the background noise dynamic, and an improvement of 2 to 4 decibels in the frequency response.

The invention has been described in detail with particular reference to preferred embodiments thereof, but it will be understood that variations and modifications can be effected within the spirit and scope of the invention.

We claim:

1. A process for preparing fine acicular crystals of gamma ferric oxide for magnetic recording comprising reacting under non-oxidizing conditions, at a temperature below 60°C, an aqueous solution of a ferrous salt with an aqueous solution of a stoichiometric excess of an alkaline hydroxide to form an aqueous dispersion of ferrous hydroxide particles;

introducing oxygen into said dispersion at a temperature of 20°–60°C for a period of time sufficient to convert said ferrous hydroxide particles to crystals of alpha FeO·OH, the concentration of ferrous salt in said aqueous solution being such that the concentration of said alpha FeO·OH formed in said dispersion is less than 15 grams per liter;

discontinuing introduction of said oxygen;

boiling said dispersion to obtain further crystallization of said alpha FeO·OH crystals;

recovering said alpha FeO·OH crystals from said dispersion; and subjecting said crystals to dehydration, reduction and oxidation to form gamma ferric oxide crystals.

2. A process in accordance with claim 1 in which said alkaline hydroxide is an alkali metal hydroxide.

3. A process in accordance with claim 2 wherein the introduction of oxygen into said dispersion is for at least 24 hours, and the boiling of said dispersion is for at least 6 hours.

4. A process in accordance with claim 2, wherein said ferrous salt is $FeSO_4 \cdot 7H_2O$, and said alkali metal hydroxide is sodium hydroxide.

5. A process in accordance with claim 2 wherein said reacting step is conducted at a temperature below about 40°C.

6. A process in accordance with claim 2 wherein the concentration of alkali metal hydroxide in said alkali metal hydroxide solution is less than 60 grams per liter.

7. A process in accordance with claim 2 wherein said oxygen is introduced as air at a rate of about 5–30 liters/hr per liter of dispersion for a period of 1–5 days.

8. A process in accordance with claim 6 wherein said aqueous solution of a ferrous salt is added to said aqueous solution of an alkali metal hydroxide.

9. A process in accordance with claim 6 wherein an aqueous solution of said alkali metal hydroxide is introduced into a vessel, and then said ferrous salt solution and an additional quantity of an aqueous solution of said alkali metal hydroxide are introduced simultaneously into said vessel.

* * * * *

PO-1050
(5/69)

UNITED STATES PATENT OFFICE
CERTIFICATE OF CORRECTION

Patent No. 3,843,773 Dated November 26, 1974

Inventor(s) Bernard-Jean Pingaud

It is certified that error appears in the above-identified patent and that said Letters Patent are hereby corrected as shown below:

In the abstract, line 4, insert --ferrous-- before "hydroxide".

Column 1, line 41, delete "alpha-FeO.OH" and substitute therefor --(alpha-FeO.OH)--.

Column 2, line 24, after "FeO.OH" insert --,--.

Column 2, line 49, delete "40°C" and substitute therefor --60°C--.

Column 3, line 21, after "soda" insert --at the beginning of the oxidation reaction--.

Signed and sealed this 4th day of March 1975.

(SEAL)
Attest:

RUTH C. MASON
Attesting Officer

C. MARSHALL DANN
Commissioner of Patents
and Trademarks